United States Patent

[11] 3,569,826

| [72] | Inventor | James H. Burnett |
| | | Wilton, N.J. |
| [21] | Appl. No. | 789,579 |
| [22] | Filed | Jan. 7, 1969 |
| [45] | Patented | Mar. 9, 1971 |
| [73] | Assignee | Edwards Company, Inc. |
| | | Norwalk, Conn. |

[54] GROUND FAULT DETECTOR APPARATUS INCLUDING A PAIR OF COMPLEMENTARILY CONNECTED BRIDGE DETECTOR MEANS FOR ISOLATED ELECTRICAL POWER SYSTEMS
6 Claims, 1 Drawing Fig.

| [52] | U.S. Cl. | 324/51, |
| | | 324/54, 340/255 |
| [51] | Int. Cl. | G01r 31/02 |
| [50] | Field of Search | 324/51, 52, |
| | | 57 (B); 340/255 |

[56] References Cited
UNITED STATES PATENTS

| 1,929,216 | 10/1933 | Pfannenmuller | (324/57B) |
| 2,141,373 | 12/1938 | Blount et al. | 324/52X |
| 2,479,051 | 8/1949 | Sunstein | (324/57B) |
| 2,589,758 | 3/1952 | Wojciechowski | (324/57B) |
| 2,999,231 | 9/1961 | Kusters et al. | 324/51X |
| 3,018,438 | 1/1962 | Mustert | (324/57B) |
| 3,492,567 | 1/1970 | Rissolo | 324/51 |

FOREIGN PATENTS

| 1,058,570 | 3/1954 | France | 324/57B |

*Primary Examiner*—Gerald R. Strecker
*Attorneys*—Harold S. Wynn and Jeremiah J. Duggan

ABSTRACT: An improved ground fault detector in which parallel dual phase sensitive bridge detectors are complementarily connected for indicating the level of the impedance to ground of the electrical line.

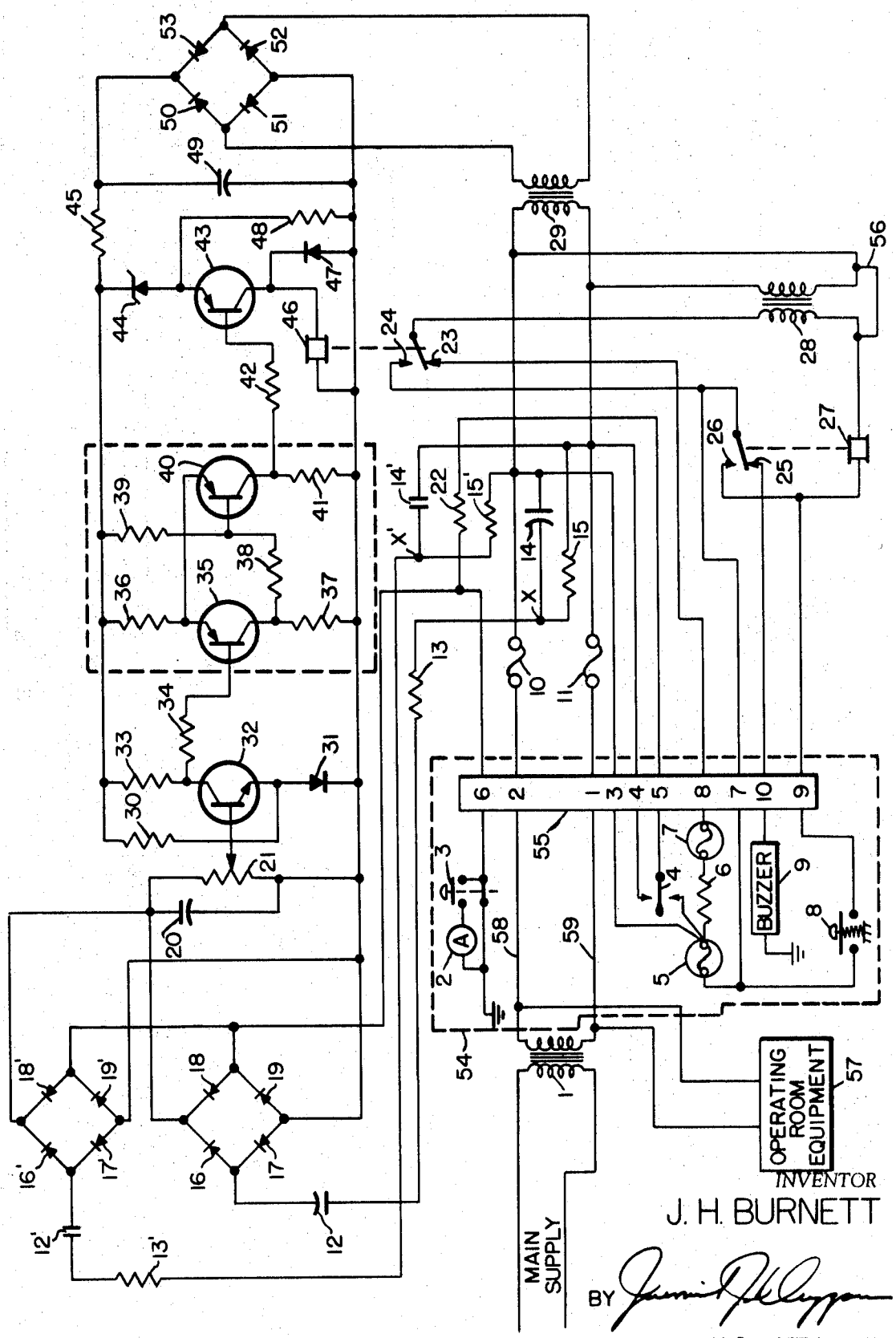
PATENTED MAR 9 1971    3,569,826
INVENTOR
J. H. BURNETT
BY
HIS ATTORNEY

GROUND FAULT DETECTOR APPARATUS INCLUDING A PAIR OF COMPLEMENTARILY CONNECTED BRIDGE DETECTOR MEANS FOR ISOLATED ELECTRICAL POWER SYSTEMS

BACKGROUND OF THE INVENTION

This invention relates to ground impedance detectors and more particularly it is concerned with indicating the resistive and capacitive reactance to ground of the lines of an isolated alternating current power supply. Although this invention may be applicable to a number of fields, it is primarily intended for use in hospital operating rooms.

Obviously, the potentially dangerous ignition conditions as well as the hazards of shock, require the stringent isolation of power lines in operating rooms. Should for any reason the impedance to ground of the power lines fall below certain specified safe levels, both equipment and operating room personnel are immediately prone to the foregoing dangers. It is essential that warning be given to cognizant personnel as soon as possible upon the development of such faults.

The present equipment available for monitoring line ground impedances substantially provides the necessary protection and warning time to maintain safe conditions. A device suitable for this purpose is described in U.S. Pat. application Ser. No. 611,707, filed Jan. 25, 1967 entitled "Apparatus for Detecting Operating Room Electrical Line Ground Faults,"by Bassil D. Rissolo. This apparatus continuously monitors the impedance to ground of each line of the power source and substantially instantaneously indicates when the level falls below certain predetermined minimum values. A phase sensitive bridge detector comprising a capacitor and resistor is serially arrayed across the power lines. The change in the potential of the junction of those components caused by developing ground faults provides the driving signal for detector circuitry connected between the junction and the ground.

This type of bridge detector normally provides adequate protection for commonly experienced types of faults, i.e., the development of resistive and capacitive paths to ground. However, its fails to provide adequate protection if the developing faults constitute impedances to ground symmetrical to the resistive and capacitive elements of the bridge; under this condition of phase balanced faults, cancellation of detector current occurs or in other words the potential across the detector current occurs or in other words the potential across the detector goes to zero and no warning indication can be given. Although the occurrence of such fault is statistically improbable, its formation is possible and warning systems capable of meeting modern day standards must have the ability to sense this type of ground fault.

In addition to the prior art device above described, other ground fault indicators are utilized which measure and/or indicate ground faults of the class just discussed by switching the detecting elements continuously between the lines. Equipment of this design fails to continuously monitor both power lines and in addition introduces variations in the power line load impedance which may cause malfunctioning of sensitive operating room equipment. Yet other devices attempt to achieve the same purpose by introducing additional impedance variations into the phase sensitive bridge element, which variations complicate the bridge conformation. The present invention obviates the foregoing difficulties by providing an improved ground fault detector which continuously monitors the impedance to ground.

It is therefore an object of this invention to provide improved ground fault detector apparatus.

It is another object of this invention to provide ground fault detector apparatus capable of indicating the presence of phase balanced ground faults.

It is another object of this invention to provide ground fault detector apparatus which continuously monitors the line impedance to ground.

SUMMARY OF THE INVENTION

In accordance with the present invention there is provided an improved ground fault detector having a first phase sensitive bridge detector means for producing a signal relative to impedance to ground of the lines of an isolated alternating current source. A circuit means having a normal output signal level generates a change in the output signal level whenever the signal reaches a predetermined threshold value corresponding to the impedance to ground being below a minimum level. Switching means responsive to the change in output signal level indicates the low impedance to ground. The improvement comprises a second complementary phase sensitive bridge detector means connected across the first phase sensitive bridge detector means connected across the first phase sensitive bridge detector means for indicating the presence of phase balanced ground faults.

For a better understanding of the present invention together with other and further objects thereof, reference is had to the following description taken in connection with the accompanying drawing.

BRIEF DESCRIPTION OF THE DRAWINGS

The drawing shows a schematic implementation of an embodiment of this invention. Conventional electrical symbols and terminology are utilized.

DESCRIPTION OF THE PREFERRED EMBODIMENTS

The structure of this invention as illustrated may be thought of as containing three sections. First, the operating room equipment 57 to be monitored; a second section 54 containing the remote indication equipment, namely, switches, indicator lights, and buzzer; and the remaining section containing the actual circuitry involved with determining the level of resistance and capacitive reactance.

In broad terms during actual use, the surgeon or an assistant surveys the equipment. Under normal conditions, the "normal" indication light 7 is energized. If at any time the resistance and capacitive reactance to ground value falls below the specified limit of 60,000 ohms, the normal operating indicator light 7 shuts off and the alert indicator light 5 and buzzer 9 are energized, giving both a visual and audible indication. Usually the surgeon will instruct that the buzzer 9 be shut off by means of an associated switch 8 and the surgical operation continued At the end of the surgical operation and after the rooms has been cleared of both personnel and flammable atmosphere, proper maintenance and trouble-shooting procedures are applied to find the breakdown. Also contained in this equipment is a test switch 4 whereby a ground is deliberately applied to one side or the other of the isolated power supply lines 58 and 59 to determine if the ground detector is properly functioning.

To enable full understanding of this invention and the concepts utilized therein, a detailed and explicit description of the circuit and its operating characteristics are now presented. The main supply transformer 1 contains a secondary winding completely insulated and isolated except for some small capacitive coupling, from ground. The output of this secondary is conducted through lines 58 and 59, terminals 2 and 1 of terminal board 55, and fuses 10 and 11 respectively to a bridge circuit comprising, resistor 15, capacitor 14, serially connected between lines 58 and 59, and a detector circuit. The other legs of the bridge circuit are formed by the impedance to ground of lines 58 and 59.

The detector circuit is joined to the junction of capacitor 14 and resistor 15 and consists of a series connected resistor 13 and capacitor 12 conducted to the junction of diodes 16, and 17 which comprise part of a full-wave bridge rectifier formed by diodes 16, 17, 18 and 19. Also connected to the detector circuit is a complementary phase sensitive bridge arrangement comprising capacitor 14', resistor 15', resistor 13', capacitor 12' an full wave bridge rectifier diodes 16', 17', 18' and 19'.

The junctions of diodes 18 and 19 as well as 18' and 19' are conducted to ground and the current drawn through the detector circuit during normal conditions is less than two milliamperes under any fault external to the detector.

The output of the full wave bridge rectifiers taken from the functions of diodes 16' and 18' and 16 and 18 are filtered by a network composed of capacitor 20 and parallel potentiometer 21 connected across the rectifier outputs. The potentiometer 21 is further used to calibrate the system to a desired sensitivity level for producing indications in accordance with the specified values of impedance levels. The dual phase sensitive impedance bridge elements are complementarily connected across the power lines in that the capacitor 14–resistor 15, and capacitor 14'–resistor 15' are in parallel but inversely connected across the lines.

As a fault resistance and/or capacitance forms between either or both lines 58 and 59 of the power source and ground, a composite signal relative to the ground impedance is applied to the detector circuit. A first bridge comprises capacitor 14 and resistor 15 serially connected across the power lines having their junction connected through series resistor 13 and capacitor 12 to the detector circuitry and indicator equipment; the ground faults extending between the detector ground and each line 58 and 59 respectively form the remaining elements of the first bridge. The second bridge is formed similarly to the first with all elements of the second having equal value to the first which correspondence is indicated by the use of the same numerical designation with a superscript '. The only dissimilarity in these bridges is the inverse connection of the capacitor 14'–resistor 15' combination of the second bridge and the capacitor 14–resistor 15 connection of the second bridge across the power lines 58 and 59.

The use of phase sensitive bridge elements permits the generation of indications of ground faults for normally experienced impedances to ground which may otherwise cause cancellation of fault currents and a failure to give proper indication. Obviously, since the voltages developed across serially arrayed capacitor-resistor combinations are separate by 90° from one another, the vector potential at their junction generates a circle function; thus under such normally experienced fault conditions there exists a potential difference between the ground and the junction point x. However, should the faults form as substantially balanced resistor and capacitor reactances across the line and should they be symmetrical with the bridge elements formed by capacitor 14 and resistor 15, then in the case of a single phase sensitive bridge, substantial if not complete, cancellation of detector current takes place.

As previously indicated, this conjunction of ground faults and bridge elements is highly improbable, but if such should occur, both the personnel and equipment is subjected to a high degree of risk and this cannot be tolerated. The introduction of dual complementary phase sensitive elements completely obviates this problem. The failure to detect depends upon the formation of symmetrical ground faults with the bridge elements; the use of complementary connected bridge elements completely prevents the formation of such faults since the same ground fault cannot complementary to inversely arranged bridge elements. Hence, the parallel connected phase sensitive bridge detectors produce a detector signal level commensurate with the greatest potential difference between the junction potential of the bridge elements and ground. The output of the full wave bridge rectifiers, appearing at capacitor 20, is equal to either the potential between ground and the junction X' of capacitor 14' and resistor 15' or junction X between capacitor 14 and resistor 15, which ever is the greatest. Such bridge arrangement continuously monitors the impedance between the lines of the power source 58 and 59 and ground at a maximum level of sensitivity even when substantially symmetrical phase balanced line faults exist. Suitable choice of component values, and threshold settings well known to those skilled in the art permits indication of any line faults exceeding specified limits.

As a resistance or capacitance forms between either or both lines 58 and 59 of the power source and ground, a composite signal relative to resistance and capacitance is applied to the detector circuit. Should an approximately equal ground resistance from on both lines, bridge current cancellation is substantially negligible due to the phase shift introduced by capacitors 14 and 14'. The signal is rectified, by the detector diodes 16, 17, 18, and 19; and diode 16', 17', 18', and 19'; and then filtered to a substantially direct current. The output of the filter circuit, taken from the arm of potentiometer 21, is applied to the base of transistor 32. Transistor 32 in conjunction with resistors 30 and 33 and diode 31 form an amplifier circuit for the detector output signal. Resistor 30 and diode 31 establish the biasing circuit for the amplifier. When the detector output signal rises above a particular level the base-emitter junction of transistor 32 is forward biased and consequentially transistor 32 conducts. Diode 31 provides a threshold voltage which must be exceeded before transistor 32 base-emitter junction is forward biased. Resistor 33 forms the load resistance for transistor 32.

The output of the amplifier is in turn, through resistor 34, conducted to the base of transistor 35. Transistor 35 forms a part of one form of Schmitt trigger circuit whereby, a rise above or below predetermined levels of signal input on the base transistor 35, produces a sharp wave front output of increasing or decreasing magnitude. The Schmitt Trigger circuit consists of transistors 35 and 40 and resistors 36, 37, 38, 39, and 41. The resistors 37 and 41 supply load resistance for transistors 35 and 40 respectively. Resistors 37, 38, and 39 form the bias resistor combination for transistor 40 and resistor 36 provides a common emitter resistor for both transistors. Analysis of this trigger circuit shows that initially transistor 35 is biased to a nonconducting state while transistor 40 is conversely and necessarily biased to a full conducting state (this being necessary because the Schmitt trigger circuit is a fully saturated bistable network). As the output of the amplifier increases to a specific threshold value determined by the setting of potentiometer 21 and the circuit biasing, transistor 35 is forced into a conducting state. When this occurs, the regenerative characteristics of the network come to the fore and transistor 35 continues to increase in conductance until it is fully saturated while transistor 40 rapidly and substantially instantaneously shuts off into a nonconducting state.

The rapid change in conduction levels of transistors 35 and 40 is effected by the change in conductance of transistor 35 as the output of transistor 32 increases or decreases. When transistor 32 conducts sufficiently as established by bias circuit parameters, transistor 35 will become conductive, this causes an increase in the voltage across resistor 36 which changes the bias on transistor 40, causing transistor 40 to come out of saturation The decrease in conductance of transistor 40 again forces the voltage across resistor 36 to decrease thereby once again increasing the conductance of transistor 35. This regenerative action continues until transistor 35 becomes saturated and transistor 40 nonconductive. At the same time the current thru resistor 37 increases and is effective in decreasing the biasing signal on the base of transistor 40 to a level under that necessary to maintain conductance. A reverse regenerative action takes place when the voltage, in response to an increase of line impedance to ground, on the base of transistor 35 is reduced to a level below that necessary to maintain saturation of transistor 35.

In actual operation the trigger circuit output, as seen on the collector of transistor 40, substantially instantaneously increases to a value approaching that of the circuit power supply, which in this instance is −24 volts, when the detector signal rises above a first predetermined threshold magnitude and connects through resistor 42 to the base of transistor 43. This transistor 43 combined with Zener diode 44, diode 47, resistor 48 and relay winding 46 establishes a highly stable biased switching network. Diode 47 provides circuit protection by shorting out the inductive surges of relay winding 46 whenever transistor 43 switches to a nonconducting state. As transistor 40, of the triggering circuit, is forced abruptly to a nonconducting state, the switching circuit, formed by transistor 43, at a controlled operating point, determined by Zener diode 44 is in like manner switched to a highly conductant state. The presence of Zener diode 44 assures that the switching circuit will follow the bistable characteristics of the schmitt trigger and only be in either a full conducting or nonconducting state. As a result, relay winding 46 is immediately energized and changes the indication aspect from a normal to an alert and at the same time instigates operation of the warning buzzer. Thus, both a visual and audible indication, impossible to ignore, is presented to the personnel present in the operating area, when the line to ground resistance and capacitive reactance falls below the predetermined level of desired or specified detection. Similarly the trigger circuit is again abruptly altered and the switching transistor 43 is completely shut off when the impedance rises above the threshold level or in other words the signal falls below a second predetermined value. Thusly, the variance between the pull-in and dropout voltage of the electromagnetic relay 46 (sometimes varying by as large a factor as 5 to 1) fails to affect the indicating level of the ground detector. This means that the establishing of indications as well as their clearing is accomplished at substantially the same level of impedance to ground. Further it is noted, that to avoid the possibility of oscillation when the impedance to ground is just at the threshold level, hystersis is added to the circuit by the presence of a resistor 45 in series with the circuit power supply. When transistor 43 conducts, the current drawn from the power supply increases, causing a resultant drop in voltage applied to the detector circuitry and prevents the Schmitt trigger from switching back until the impedance level is increased to some second predetermined value above the threshold setting.

The indicator circuitry and the detector circuitry power supply are powered from transformers 28 and 29 respectively. The output voltage of the secondary of these transformers is 24 volts, commensurate with the operating voltage levels of the power supply components, and the transistor and the indicator circuitry. Relay 46 controls actuation of the specified indications provided in the following manner: contacts 23 (normally closed) and 24 (normally open) of relay 46 are connected to one side of transformer 28. Contact 23 establishes a circuit connecting one side of the transformer 28 winding to terminal 8 on terminal board 55 of the remote equipment 54. This terminal in turn connects to the normal indicator light 7 which through resistor 6, terminal 3 and a wire 56 electrically connects to the other side of the secondary winding of transformer 28. Obviously this energizes the normal indicator lamp 7.

When relay 46 is energized, contact 23 opens, extinguishing the normal indicator lamp 7, and contact 24 closes resulting in the following indications; Contact 24 connects one side of the secondary of transformer 28 to the alert lamp 5 while the other side of this lamp is connected through terminal 3 of terminal board 55 to the other side of the transformer 28 secondary winding in similar fashion as that described for indicator lamp 7. This immediately results in the energization of indicator lamp 5 presenting an alert aspect. As the same instant, contact 24 electrically connects through the normally closed contact 25 of relay 27 to terminal 10 of terminal board 55 which connects to a buzzer 9, thus, in addition to the visual alert aspect, presenting an audible indication of circuit malfunction. To enable operating personnel to end the audible indication which is a source of annoyance, a switch 8 is provided whereby relay 27 is energized opening contact 25 and preventing buzzer operation. Relay 27 is held in this energized state by the closing of its stick contact 26, and as long as relay 46 remains energized will stick or continuously energize itself across the secondary winding of transformer 28.

The circuit power supply previously referred to is one of standard design and an commonly adaptable power supply source would serve the purpose. The particular circuit used in this invention consists of a full-wave rectifier formed by diodes 50, 51, 52, and 53 in conjunction with filtering capacitor 49 and resistor 45, and provides a DC voltage of approximately +24 volts with a ripple factor consistent with direct current supply requirements for transistor circuitry.

A feature briefly mentioned in the initial description of the invention is the detector test switch 4. This is a three position switch i.e. on, neutral and on, and is contained in the remote equipment 54. The arm of the switch connects through terminal 5 of terminal board 55 to resistor 22 and thence to ground through terminal 6. The contacts of the switch connect through terminals 1 and 2 to the power source lines 59 and 58 respectively. Dependent upon the position in which the switch is placed, a conductance path through resistor 22 or an open circuit is presented to either line. When either line is connected to ground, both the alert indicator 7 and buzzer 9 should give their respective alarms. Failure to so indicate means possible malfunction in the ground detector equipment. Also, contained in the remote equipment section 54 is an ammeter 2, which when placed in the circuit by plug-in jack 3, measures the current drawn from the junction of diodes 18 and 19 to ground, thus permitting an immediate measurable indication of the current through the detector which as specified must not exceed 2 milliamperes under any condition of line fault external to the detector.

Consideration of the foregoing operational analysis indicates that this invention provides an improved ground fault detector. The inclusion of a second complimentary parallel connected phase sensitive bridge detector provides for continuous monitoring of line impedance to ground and indicates the existence of phase balanced faults.

The form of invention herein presented is intended to be exemplary and therefore is inclusive of all those possible modification and variations which become obvious to one skilled in the art upon reading of the disclosure.

I claim:

1. A ground fault detector comprising:
   first phase sensitive bridge detector means producing a signal relative to impedance to ground of the lines of an isolated alternating current source, circuit means having a normal output signal level for generating a change in the output signal level whenever the signal reaches a predetermined threshold value corresponding to the impedance to ground being below a minimum level, and switching mean responsive to the change in output signal level for indicating the minimum level impedance to ground;
   the improvement comprising, a second complementary phase sensitive bridge detector means parallel connected across the first phase sensitive bridge detector means for indicating the presence of phase balanced ground faults and
   wherein the first phase sensitive bridge detector means includes serially arrayed capacitor and resistor bridge elements connected across the lines of said alternating current source, and the second phase sensitive bridge detector means includes, second serially arrayed capacitor and resistor bridge elements complementarily connected across the lines of said alternating current source so that the first serially array capacitor and resistor bridge elements and the second serially arrayed capacitor and resistor bridge elements are in parallel, but inversely connected across the lines of said alternating current source.

2. The improved detector of claim 1 wherein the output signal level substantially instantaneously changes to a second level whenever the signal reaches the predetermined threshold value and returns substantially instantaneously to the normal output signal level whenever the signal reaches a second predetermined threshold value, the circuit means being biased so that the second predetermined threshold value is lower than the first for preventing oscillation between the output levels.

3. The improved detector of claim 1 wherein the circuit means is connected to both the first and the second phase sensitive bridge detector means, the circuit means therefore being responsive to a composite signal relative to the higher of the first and second detector signals.

4. The improved detector of claim 3 wherein first and second resistor-capacitor combination are serially connected to the capacitor and resistor junctions of the first and second capacitor and resistor bridge elements respectively, first and second diode full wave bridge rectifiers are connected between the circuit means and the first and second resistor-capacitor combinations respectively; and the circuit means includes a filter connecting to both the first and second rectifiers for smoothing the composite of the two signals.

5. The detector of claim 4 wherein the circuit means further includes:
- an amplifier responsively coupled to filter means for amplifying the composite signal; and
- a bistable trigger circuit responsive to said amplified signal for generating said instantaneous change in output signal level.

6. The improved detector of claim 5 wherein
the switching mean comprises, a transistor base coupled to said bistable circuit which conductance state is substantially instantaneously switched in conjunction with said changes in output voltage levels; and
an electromagnetic relay opens and closes in conjunction with changes in the conductive state of said switching means.